United States Patent
Fukui et al.

(10) Patent No.: US 10,357,947 B2
(45) Date of Patent: Jul. 23, 2019

(54) FLUOROALKYL-CONTAINING CURABLE ORGANOPOLYSILOXANE COMPOSITION, CURED OBJECT OBTAINED THEREFROM, AND ELECTRONIC COMPONENT OR DISPLAY DEVICE INCLUDING SAID CURED OBJECT

(71) Applicant: Dow Corning Toray Co., Ltd., Tokyo (JP)

(72) Inventors: Hiroshi Fukui, Chiba (JP); Toru Masatomi, Chiba (JP); Takuya Ogawa, Chiba (JP)

(73) Assignee: DOW TORAY CO., LTD., Tokyo (JP)

( * ) Notice: Subject to any disclaimer, the term of this patent is extended or adjusted under 35 U.S.C. 154(b) by 0 days.

(21) Appl. No.: 15/565,251

(22) PCT Filed: Mar. 9, 2016

(86) PCT No.: PCT/JP2016/001299
§ 371 (c)(1),
(2) Date: Oct. 9, 2017

(87) PCT Pub. No.: WO2016/163069
PCT Pub. Date: Oct. 13, 2016

(65) Prior Publication Data
US 2018/0065347 A1 Mar. 8, 2018

(30) Foreign Application Priority Data
Apr. 10, 2015 (JP) .................. 2015-080785

(51) Int. Cl.
*C08G 77/24* (2006.01)
*B32B 27/28* (2006.01)
(Continued)

(52) U.S. Cl.
CPC ............ *B32B 27/283* (2013.01); *C08L 83/08* (2013.01); *C09D 183/08* (2013.01); *G06K 11/06* (2013.01);
(Continued)

(58) Field of Classification Search
None
See application file for complete search history.

(56) References Cited

U.S. PATENT DOCUMENTS 4,585,848 A * 4/1986 Evans .................... C08G 77/24
528/15
4,719,275 A 1/1988 Benditt et al.
(Continued)

FOREIGN PATENT DOCUMENTS

JP S6312662 A 1/1988
JP S6356563 A 3/1988
(Continued)

OTHER PUBLICATIONS

Data sheet for Poly(methyl-3,3,3-trifluoropropylsiloxane) of molecular weight 14,000, 1 page, 2018. (Year: 2018).*
(Continued)

*Primary Examiner* — Robert S Loewe
(74) *Attorney, Agent, or Firm* — Warner Norcross & Judd LLP

(57) ABSTRACT

A curable organopolysiloxane composition containing a fluoroalkyl group is disclosed. The composition comprises: (A) an organopolysiloxane containing a fluoroalkyl group, having at least two alkenyl groups in a molecule, where 10 mol % or more of all substitution groups on the silicon atoms is a fluoroalkyl group, and the average degree of polymerization is less than 150; (B) an organohydrogen polysiloxane having at least two silicon-bonded hydrogen atoms in a molecule at an amount where the silicon-bonded hydrogen
(Continued)

atoms in the component is 0.1 to 1.0 mol with regard to a total of 1 mol of the alkenyl groups in component (A); (C) an effective amount of a hydrosilylation reaction catalyst; and optionally, (D) a solvent. The composition generally has a high dielectric constant and favorable transparency. A cured product and applications of the composition and the cured product thereof are also disclosed.

10 Claims, 1 Drawing Sheet

(51) Int. Cl.
    *C08L 83/08*     (2006.01)
    *G06K 11/06*     (2006.01)
    *C09D 183/08*     (2006.01)
    *G06F 3/00*     (2006.01)
    *C01G 19/02*     (2006.01)

(52) U.S. Cl.
    CPC ............ *C01G 19/02* (2013.01); *C08G 77/24* (2013.01); *C08G 2220/00* (2013.01); *C08J 2300/26* (2013.01); *C08J 2383/08* (2013.01); *G06F 3/00* (2013.01); *G09G 2300/02* (2013.01)

(56) References Cited

U.S. PATENT DOCUMENTS

| | | | | |
|---|---|---|---|---|
| 4,785,066 | A | | 11/1988 | Maxson |
| 4,898,903 | A | | 2/1990 | Rasch et al. |
| 5,059,649 | A | * | 10/1991 | Mason ..................... C08K 5/17 252/183.12 |
| 5,239,035 | A | * | 8/1993 | Maxson .................. C08L 83/04 528/15 |
| 5,519,096 | A | | 5/1996 | Hara |
| 6,280,749 | B1 | * | 8/2001 | Omura .................. A61K 8/897 423/324 |
| 6,841,647 | B2 | * | 1/2005 | Walker .................. C08G 77/50 525/474 |
| 2003/0040596 | A1 | | 2/2003 | Nakamura et al. |
| 2011/0189382 | A1 | | 8/2011 | Wilczek |
| 2012/0219794 | A1 | | 8/2012 | Seth et al. |
| 2012/0231245 | A1 | | 9/2012 | Kim et al. |
| 2013/0069890 | A1 | | 3/2013 | Lee et al. |
| 2014/0175504 | A1 | | 6/2014 | Kobayashi et al. |
| 2017/0260383 | A1 | | 9/2017 | Fukui et al. |

FOREIGN PATENT DOCUMENTS

| | | | |
|---|---|---|---|
| JP | H02274765 | A | 11/1990 |
| JP | H0770444 | A | 3/1995 |
| JP | 3178968 | B2 | 4/2001 |
| JP | 2002148469 | A | 5/2002 |
| JP | 2012251116 | A | 12/2012 |
| JP | 2013010881 | A | 1/2013 |
| JP | 2013500151 | A | 1/2013 |
| JP | 201365009 | A | 4/2013 |
| JP | 2013512326 | A | 4/2013 |
| JP | 2013194113 | A | 9/2013 |
| JP | 2014139292 | A | 7/2014 |
| JP | 2014522436 | A | 9/2014 |
| JP | 2014196462 | A | 10/2014 |
| WO | WO2012166870 | A1 | 12/2012 |
| WO | WO2014105959 | A1 | 7/2014 |
| WO | WO2016031242 | A1 | 3/2016 |

OTHER PUBLICATIONS

Data sheet for Poly(3,3,3-trifluoropropylmethylsiloxane) of molecular weight 4,600, 1 page, 2018. (Year: 2018).*
PCT/JP2016/001299 International Search Report dated Jun. 14, 2016, 3 pages.
English language abstract and machine translation for JP2012251116 (A) extracted from http://worldwide.espacenet.com database on Jan. 9, 2018, 20 pages.
English language abstract and machine translation for JP2013010881 (A) extracted from http://worldwide.espacenet.com database on Jan. 9, 2018, 22pages.
English language abstract and machine translation for JP2013194113 (A) extracted from http://worldwide.espacenet.com database on Jan. 9, 2018, 15 pages.
English language abstract and machine translation for JP2014196462 (A) extracted from http://worldwide.espacenet.com database on Jan. 9, 2018, 17 pages.

* cited by examiner

[FIG. 1]
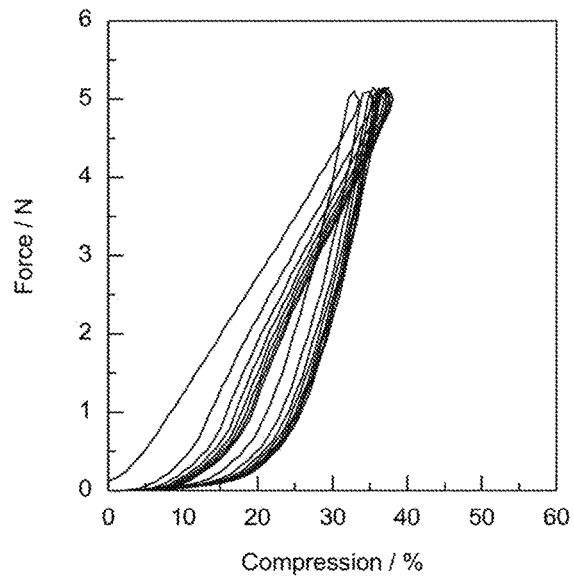
[FIG. 2]
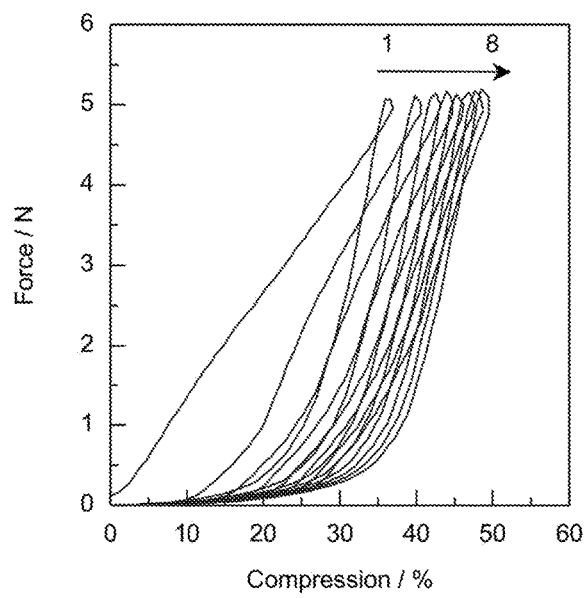

FLUOROALKYL-CONTAINING CURABLE ORGANOPOLYSILOXANE COMPOSITION, CURED OBJECT OBTAINED THEREFROM, AND ELECTRONIC COMPONENT OR DISPLAY DEVICE INCLUDING SAID CURED OBJECT

CROSS-REFERENCE TO RELATED APPLICATIONS

This application is the National Stage of International Application No. PCT/JP2016/001299 filed on 9 Mar. 2016, which claims priority to and all advantages of JP Patent Application No. 2015-080785 filed on 10 Apr. 2015, the content of which is hereby incorporated by reference.

TECHNICAL FIELD

The present invention relates to a curable organopolysiloxane composition containing a fluoroalkyl group with a high dielectric constant and favorable transparency, and a cured product thereof, and particularly relates to a member for a display device or electronic material including a film-shaped or sheet-shaped dielectric layer, and a display device, preferably a touch panel, having these members.

BACKGROUND ART

Polysiloxane-based gel-like materials are often used as a semiconductor sealing material that utilizes the excellent electrical insulating properties, heat resistance, cold resistance, and stress relieving properties of the material, and protects a semiconductor from external obstacles such as stress generated from a cooling and heating cycle, heat, moisture, and the like. The favorable stress relieving properties thereof are due to a low elastic modulus of polysiloxane gel and a high compression ratio. On the other hand, high viscosity with regard to various substrates is also provided, derived from the surface properties of the gel-like material.

The aforementioned properties and high transparency of the polysiloxane-based gel-like material have been utilized, and in recent years, application to the field of electronic display elements such as smart devices and the like has been studied. The device has a structure where a film formed from a plurality of layers including an electrode layer, dielectric layer, display layer, and the like is interposed between transparent substrates, and in order to protect the electrode layer and display layer, improve adhesion and pressure-sensitive adhesion between the layers, and form a dielectric layer, a polysiloxane-based gel-like material with high heat resistance, cold resistance, and transparency is expected to function effectively.

In the smart apparatuses, high dielectric properties, high compression ratio, and low compression permanent strain are included in addition to excellent transparency as material properties of the dielectric layer material required in pressure sensors and other sensor applications. In order to enhance the sensor sensitivity, a high electrostatic capacitance under a constant pressure must be achieved, and for this purpose, a high dielectric constant is strongly required in the used material. Furthermore, in order to achieve a high sensitivity even under low pressure, a material with a high compression ratio is preferable. Furthermore, from the perspective of durability and reliability, low compression permanent strain, in other words, high resilience must be exhibited.

In order to enhance the specific permittivity of polysiloxane-based materials, introducing a fluoroalkyl group having a plurality of fluorine atoms on a silicon atom is already known to be effective, and the present inventors also disclosed that an organopolysiloxane cured product containing a fluoroalkyl group has a high specific permittivity, and is useful as a transducer material (Patent Literature 1). However, the organopolysiloxane cured product has an essentially elastomer form, and therefore, the compression ratio cannot be said to be sufficiently high, and high sensor sensitivity is difficult to achieve. Furthermore, an organopolysiloxane composition containing a fluoroalkyl group, selectively adhered to a specific thermoplastic resin is disclosed (Patent Literature 2). A polysiloxane rubber cured product obtained herein has high adhesion to a substrate, and therefore, if pressure is applied from above a glass, plastic, or other substrate, a problem exists where high adhesive properties between the substrate-polysiloxane are an obstacle, and thus the compression ratio is reduced.

On the other hand, a solvent resistant silicone gel composition is disclosed as an organopolysiloxane containing a fluoroalkyl group, where a cured product is gel-like. The material has a branched organopolysiloxane as a primary component, and has characteristics where flexibility is high even at a low temperature. On the other hand, technology with two types of polymers with different degrees of polymerization is not disclosed anywhere. Furthermore, there is neither mention nor suggestion of the dielectric properties, compression, and recovery properties of the cured product, application to a dielectric layer material or display device, and technology of film forming technology. Therefore, an addition curing type organopolysiloxane containing an fluoroalkyl group with excellent transparency, high specific permittivity, and excellent compression and recovery properties, a dielectric layer film containing the organopolysiloxane, and a display device configured from the dielectric layer film have not been reported to date.

CITATION LIST

Patent Literature

Patent Literature 1: WO 2014/105959
Patent Literature 2: JP 2013-194113 A
Patent Literature 3: JP 3178968 B

SUMMARY OF INVENTION

Problem to be Resolved by the Invention

In order to resolve the aforementioned problems, an object of the present invention is to provide an organopolysiloxane composition containing a fluoroalkyl group, having a function as a dielectric layer used in touch panels and the like, having excellent transparency and compression and recovery properties, having favorable processability for manufacturing a molded product such as a film or the like, and having a high specific permittivity. Furthermore, an object of the present invention is to further provide an addition curing type organopolysiloxane composition containing a fluoroalkyl group with almost no shrinking during mold processing, high curing rate, and in which desired curing conditions are easy to set.

Similarly, an object of the present invention is to provide an application of the organopolysiloxane composition containing a fluoroalkyl group as an electronic material and member for a display device, and particularly a transducer material such as a sensor or the like.

Means for Resolving Problems

As a result of extensive studies in order to resolve the aforementioned problems, the present inventors discovered that the aforementioned problems can be resolved by a curable organopolysiloxane composition containing a fluoroalkyl group, containing a fluoroalkyl group where the average degree of polymerization is regulated, preferably having a straight chain organopolysiloxane containing a fluoroalkyl group as a primary component, and which can be cured by an addition reaction using a specific amount of organohydrogen polysiloxane, thereby arriving at the present invention. The cured product of the curable organopolysiloxane composition containing a fluoroalkyl group can be used as a new dielectric layer material with excellent transparency and a high specific permittivity. Note that the present inventors discovered that the aforementioned problems can be more preferably solved when the fluoroalkyl group is a trifluoropropyl group, and that the aforementioned problems can be even more preferably solved if the organohydrogen polysiloxane is an organohydrogen polysiloxane having a trifluoropropyl group in a molecule, thereby arriving at the present invention.

In other words, a first object of the present invention is solved by (1) a curable organopolysiloxane composition containing a fluoroalkyl group, containing:
(A) 100 parts by mass of an organopolysiloxane containing a fluoroalkyl group, having at least two alkenyl groups with 2 to 12 carbon atoms in a molecule, where 10 mol % or more of all substitution groups on the silicon atoms is a fluoroalkyl group as expressed by $(C_pF_{2p+1})$—R— (where R represents an alkylene group with 1 to 10 carbon atoms, and p represents an integer from 1 to 8), and the average degree of polymerization is less than 150;
(B) an organohydrogen polysiloxane having at least two silicon-bonded hydrogen atoms in a molecule at an amount where the silicon-bonded hydrogen atoms in the component is 0.1 to 1.0 mol with regard to a total of 1 mol of alkenyl groups in component (A);
(C) an effective amount of a hydrosilylation reaction catalyst; and
(D) 0 to 2000 parts by mass of a solvent, with regard to a total of 100 parts by mass of components (A) to (C).

The first object of the present invention is preferably solved by the following compositions.

(2) The curable organopolysiloxane composition containing a fluoroalkyl group according to (1), wherein the aforementioned (A) is an organopolysiloxane as expressed by the following average unit formula (I):

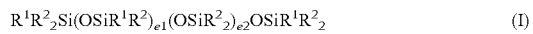  (I)

{Where $R^1$ represents a fluoroalkyl group as expressed by $(C_pF_{2p+1})$—R— (where R represents the same group as above, and p represents the same number as above) or an alkenyl group with 2 to 12 carbon atoms, $R^2$ represents the same of different alkyl group with 1 to 12 carbon atoms, aryl group with 6 to 20 carbon atoms, aralkyl group with 7 to 20 carbon atoms, hydroxyl group, or alkoxy group with 1 to 6 carbon atoms, where of all $R^1$s, at least two are alkenyl groups with 2 to 12 carbon atoms, and e1 and e2 represent 0 or a positive number, and are numbers that satisfy 5<e1+e2<148}.

(3) The curable organopolysiloxane composition containing a fluoroalkyl group according to (1) or (2), wherein the aforementioned (A) is an organopolysiloxane as expressed by the following average unit formula (II):

  (II)

{Where $R^{Vi}$ represents an alkenyl group with 2 to 12 carbon atoms, $R^2$ represents the same group as above, $R^3$ represents a fluoroalkyl group as expressed by $(C_pF_{2p+1})$—R— (where R represents the same group as above, and p represents the same number as above), and e is a number that satisfies 5<e<148}.

(4) The curable organopolysiloxane composition containing a fluoroalkyl group according to any one of (1) to (3), wherein the fluoroalkyl group as expressed by $(C_pF_{2p+1})$—R— (where R represents the same group as above, and p represents the same number as above) in the aforementioned component (A) is a trifluoropropyl group.

The first object of the present invention is particularly preferably solved by the following compositions for component (B).

(5) The curable organopolysiloxane composition containing a fluoroalkyl group according to any one of (1) to (4), wherein the aforementioned component (B) is an organohydrogen polysiloxane having a group containing fluorine.

(6) The curable organopolysiloxane composition containing a fluoroalkyl group according to any one of (1) to (5), wherein the aforementioned component (B) is an organohydrogen polysiloxane having a fluoroalkyl group as expressed by $(C_pF_{2p+1})$—R— (where R represents the same group as above, and p represents the same number as above).

(7) The curable organopolysiloxane composition containing a fluoroalkyl group according to any one of (1) to (6), wherein the aforementioned component (B) is an organohydrogen polysiloxane having a trifluoroalkyl group in a molecule.

(8) The curable organopolysiloxane composition containing a fluoroalkyl group according to any one of (1) to (7), wherein the aforementioned component (B) is an organopolysiloxane as expressed by the following average unit formula (III) or (IV).

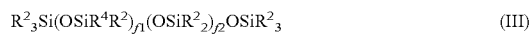  (III)

{Where $R^4$ represents a fluoroalkyl group as expressed by $(C_pF_{2p+1})$—R— (where R represents the same group as above, and p represents the same number as above) or a silicon-bonded hydrogen atom, $R^2$ represents the same group as above, where of all $R^4$s, at least two are silicon-bonded hydrogen atoms, and f1 and f2 represent 0 or a positive number, and are numbers that satisfy 5<f1+f2<148}

  (IV)

{Where $R^5$ represents a fluoroalkyl group as expressed by $(C_pF_{2p+1})$—R— (where R represents the same group as above, and p represents the same number as above), $R^2$ represents the same group as above, f3 and f4 represent a positive number, and f3+f4 is a number where the weight average molecular weight of the organohydrogen polysiloxane as expressed by formula (IV) is within a range of 400 to 10,000}.

The first object of the present invention is particularly preferably solved by the following compositions for component (A).

(9) The curable organopolysiloxane composition containing a fluoroalkyl group according to any one of (1) to (8), wherein the aforementioned component (A) is the following component (A1) or component (A2):

(A1) an organopolysiloxane having at least two alkenyl groups with 2 to 12 carbon atoms in a molecule, where 10 mol % or more of all substitution groups on the silicon atoms is a fluoroalkyl group as expressed by $(C_pF_{2p+1})$—R— (where R represents an alkylene group with 1 to 10 carbon atoms, and p represents an integer from 1 to 8), the average degree of polymerization is less than 150, and the volume content rate of the organopolysiloxane having a degree of polymerization of 250 or more is less than 10%; and (A2) an organopolysiloxane containing a fluoroalkyl group, containing the following component (a1) and component (a2) with different polymerization degree distributions, where the average degree of polymerization of the entire mixture is less than 150:

(a1) an organopolysiloxane having at least two alkenyl groups with 2 to 12 carbon atoms in a molecule, where 10 mol % or more of all substitution groups on the silicon atoms is a fluoroalkyl group as expressed by $(C_pF_{2p+1})$—R— (where R represents an alkylene group with 1 to 10 carbon atoms, and p represents an integer from 1 to 8), and the average degree of polymerization is 200 or more; and (a2) an organopolysiloxane having at least two alkenyl groups with 2 to 12 carbon atoms in a molecule, where 10 mol % or more of all substitution groups on the silicon atoms is a fluoroalkyl group as expressed by $(C_pF_{2p+1})$—R— (where R represents an alkylene group with 1 to 10 carbon atoms, and p represents an integer from 1 to 8), and the average degree of polymerization is 50 or less.

The second object of the present invention is a use as a cured product formed by curing the curable organopolysiloxane composition containing a fluoroalkyl group, use thereof as an electronic material or member for a display device, and an electronic component/display device including the use, and is achieved by the following inventions.

(10) A cured product formed by curing the curable organopolysiloxane composition containing a fluoroalkyl group according to any one of (1) to (9).

(11) A member for a display device or electronic material, formed by curing the curable organopolysiloxane composition containing a fluoroalkyl group according to any one of (1) to (9), and having a film shape or sheet shape.

(12) A member for a display device or electronic material, formed by curing the curable organopolysiloxane composition containing a fluoroalkyl group according to any one of (1) to (9), which is a gel or elastomer.

(13) A member for a display device or electronic material, formed by curing the curable organopolysiloxane composition containing a fluoroalkyl group according to any one of (1) to (9), which is an essentially transparent dielectric layer.

(14) A member for a display device or electronic material, formed by curing the curable organopolysiloxane composition containing a fluoroalkyl group according to any one of (1) to (9), which is an essentially transparent film-shaped or sheet-shaped dielectric layer.

(15) A display device or electronic component, including: the member for a display device or electronic material according to any one of (11) to (14).

(16) A display or display panel, including: the member for a display device or electronic material according to any one of (11) to (14).

The third object of the present invention is a touch panel using a cured product formed by the curable composition of the present invention, and is achieved by the following inventions.

(17) A touch panel, including: a substrate where a conductive layer is formed on one surface; and a film-shaped or sheet-shaped cured layer formed by curing the curable organopolysiloxane composition containing a fluoroalkyl group according to any one of (1) to (9), adhered to the conductive layer of the substrate or a surface on an opposite side thereof.

(18) The touch panel according to (17), wherein the substrate on which the conductive layer is formed is a resin film or glass on which an ITO layer is formed on one surface.

Effect of the Invention

The present invention can provide an organopolysiloxane composition containing a fluoroalkyl group having excellent transparency of a cured product, which can be readily processed in a film form, and having a high specific permittivity. The organopolysiloxane composition containing a fluoroalkyl group is an addition curing type composition, and has advantages of almost no shrinking during mold processing, a high curing rate, and desired curing conditions being easy to set. Furthermore, the organopolysiloxane cured product containing a fluoroalkyl group of the present invention has a high specific permittivity, a high compression ratio, and favorable recovery properties, and therefore if applied as a dielectric layer, pressure responsiveness even under low pressure is excellent, and high sensor sensitivity can be achieved. Therefore, a dielectric layer film processed into a film form can be preferably used as an electronic material or electronic component for a display device, and particularly preferably a transducer material such as a sensor or the like, and has a particular advantage of being able to provide a display device such as a touch panel or the like.

BRIEF DESCRIPTION OF THE DRAWINGS

FIG. 1 is a recording curve of strain (compression/%)–compression force (Force/N) when measurements are performed 8 times using a texture analyzer for a film according to Example 7.

FIG. 2 is a recording curve of strain (compression/%)–compression force (Force/N) when measurements are performed 8 times using a texture analyzer for a film according to Comparative Example 1.

DESCRIPTION OF EMBODIMENTS

A curable organopolysiloxane composition containing a fluoroalkyl group of the present invention will be described below in detail. A curable organopolysiloxane composition containing a fluoroalkyl group of the present invention contains the following components (A) to (C) and an optional solvent (D), and the components will be described first.

Component (A)

Component (A) is a main agent of a curable composition, and is an organopolysiloxane containing a fluoroalkyl group, having at least two alkenyl groups with 2 to 12 carbon atoms in a molecule, where 10 mol % or more of all substitution groups on the silicon atoms is a fluoroalkyl group as expressed by $(C_pF_{2p+1})$—R— (where R represents an alkylene group with 1 to 10 carbon atoms, and p represents an integer from 1 to 8), and the average degree of polymerization is less than 150.

Component (A) has a constant amount or more of fluoroalkyl groups, and has at least two alkenyl groups in a molecule, and therefore provides a cured product with excellent moldability, reaction controllability, and transparency, and a relatively high specific permittivity, by crosslinking by an addition reaction (hydrosilylation reaction) with component (B). The structure is not particularly limited, and may be a straight chain, branched chain, cyclic, or a resin organopolysiloxane essentially having a $R^3SiO_{3/2}$ unit (trifunctional siloxane unit) or $SiO_2$ unit (tetrafunctional siloxane unit). Furthermore, a mixture of one or more type of organopolysiloxanes with different molecular structures or average degrees of polymerization may be used. However, if applied as a dielectric layer, a high compression ratio and favorable recovery properties are achieved, and if a low pressure-sensitive adhesive force is required, the trifunctional siloxane unit or tetrafunctional siloxane unit is preferably not provided. Component (A) is particularly preferably a straight chain organopolysiloxane containing a fluoroalkyl group.

In component (A), 10 mol % or more, preferably 20 mol % or more, and more preferably 40 mol % or more of all substitution groups on a silicon atom are fluoroalkyl groups as expressed by $(C_pF_{2p+1})$—R— (R represents an alkylene group with 1 to 10 carbon atoms, and p represents an integer from 1 to 8). When the amount of the fluoroalkyl groups is less than the lower limit, the specific permittivity of a cured product obtained by curing the curable organopolysiloxane composition is reduced, and therefore is inappropriate. Note that if the amount of fluorine atoms in a fluoroalkyl group as expressed by $(C_pF_{2p+1})$—R— is high, in other words, the p value is high, for example p≥4, and the number of carbon atoms in an alkylene group which is R is low, the amount of the fluoroalkyl groups can achieve a technical effect of the present invention even with a value close to the lower limit of the aforementioned range. In particular, the content rate of fluorine atoms in component (A) is preferably 10 mass % or more. Note that if a trifluoropropyl group is selected as the fluoroalkyl group, setting all substitution groups on a silicon atom in component (A) to 40 mol % or more, and particularly 50 mol % or more is one of the most preferred embodiments of the present invention.

The fluoroalkyl group as expressed by $(C_pF_{2p+1})$—R— is an essential functional group in component (A) of the present invention, and is a preferred functional group in component (B). The fluoroalkyl group provides a cured product with an excellent specific permittivity, improves compatibility of the components due to the components having a fluorine atom, and provides a cured product with excellent transparency. Specific examples of the fluoroalkyl group include trifluoropropyl groups, pentafluorobutyl groups, heptafluoropentyl groups, nonafluorohexyl groups, undecafluoroheptyl groups, tridecafluorooctyl groups, pentadecafluorononyl groups, and heptadecafluorodecyl groups. Of these, a group where p=1, in other words, a trifluoropropyl group is a preferred group from the perspective of dielectric properties, economy, ease of manufacturing, and molding processability of the obtained curable organopolysiloxane composition.

Component (A) has at least two alkenyl groups with 2 to 12 carbon atoms in a molecule. Examples of the alkenyl group with 2 to 12 carbon atoms preferably include vinyl groups, allyl groups, hexenyl groups, and octenyl groups from the perspective of economy and reactivity, and vinyl groups and hexenyl groups are more preferably used. Other silicon-bonded functional groups in component (A) are not particularly limited, but examples include alkyl groups with 1 to 12 carbon atoms, aryl groups with 6 to 20 carbon atoms, aralkyl groups with 7 to 20 carbon atoms, hydroxyl groups, and alkoxy groups with 1 to 6 carbon atoms. A methyl group is preferred as the alkyl group with 1 to 12 carbon atoms when considering economy and heat resistance. Examples of the aryl group with 6 to 20 carbon atoms preferably include phenyl groups, methyl phenyl groups (tolyl groups), and naphthyl groups from the perspective of economy. Benzyl groups and phenethyl groups are preferably used as the aralkyl group with 7 to 20 carbon atoms. Furthermore, examples of the alkoxy group with 1 to 6 carbon atoms preferably include methoxy groups, ethoxy groups, and n-propoxy groups. Note that a constant amount or more of all substitution groups on a silicon atom in component (A) are the aforementioned fluoroalkyl groups, which have 2 or more alkenyl groups with 2 to 12 carbon atoms in a molecule, but other silicon-bonded functional groups are preferably a methyl group, phenyl group, or hydroxyl group, and are particularly preferably selected from methyl groups and phenyl groups.

Component (A) of the present invention has an average degree of polymerization that is less than 150. If a cured layer formed from the composition of the present invention is a dielectric layer, and particularly a transparent gel-like dielectric layer, the average degree of polymerization may be less than 145, less than 120, less than 110, less than 105, less than 100, less than 95, less than 90, or less than 85, from the perspective of preferably achieving a compression ratio, favorable recovery properties, and a low pressure-sensitive adhesive force. Note that the lower limit of the average degree of polymerization is not limited, but may be 7 or higher, 10 or higher, 15 or higher, or 20 or higher. The average degree of polymerization of component (A) is particularly preferably within a range of 10 to 90 or 20 to 80, where a gel-like cured product molded into a film/sheet shape is easy to obtain, and the cured product has a low pressure-sensitive adhesive, and exhibits a high compression ratio and favorable recovery properties. Furthermore, under a low temperature of 0° C. or lower for example, change in the aforementioned physical properties is low, and therefore, if applied as a dielectric layer of a display device such as a touch panel or the like, pressure responsiveness is excellent even under low pressure, and a high sensor sensitivity stabilized in a wide temperature range can be achieved.

Herein, the degree of polymerization of the organopolysiloxane which is component (A) can be determined by an integral ratio of a peak intensity using $^{29}Si$ NMR, and "average degree of polymerization" in the present invention refers to the average degree of polymerization of the entire body if one or more molecular weight distribution is present in component (A). Component (A) may be an organopolysiloxane having one molecular weight distribution, or a mixture containing two types or more of an organopolysiloxane with different molecular weight distributions, and the peak shape of the molecular weight distribution may be monomodal or multimodal. Note that in a quantitative range where the average degree of polymerization is within the aforementioned range, two or more types of organopolysiloxane containing a fluoroalkyl group are used in combination, and therefore, the possibility of selecting a raw material during composition design may increase, and the physical properties of a cured product formed by the composition of the present invention may further improve.

Component (A) is particularly preferably one type of straight chain organopolysiloxane having a constant amount or more of a fluoroalkyl group, having at least two alkenyl groups, and having an average degree of polymerization that is less than 150, as expressed by average unit formula (I).

[Average unit formula]

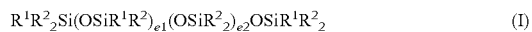

$$R^1R^2{}_2Si(OSiR^1R^2)_{e1}(OSiR^2{}_2)_{e2}OSiR^1R^2{}_2 \quad (I)$$

In the formula, substitution groups as expressed by $R^1$ are similarly or independently the aforementioned fluoroalkyl group or alkenyl group with 2 to 12 carbon atoms, and specific examples thereof are the same as described above. Furthermore, the substitution groups expressed by $R^2$ can be the same or different alkyl groups with 1 to 12 carbon atoms, aryl groups with 6 to 20 carbon atoms, aralkyl groups with 7 to 20 carbon atoms, a hydroxyl group, or alkoxy groups with 1 to 6 carbon atoms, and of all $R^1$s, at least two are alkenyl groups with 2 to 12 carbon atoms. Preferably, the amount of the alkenyl groups with 2 to 12 carbon atoms in component (A) may be 0.01 to 1.00 mass % and 0.02 to 0.25 mass %, and groups other than the fluoroalkyl groups and the alkenyl groups with 2 to 12 carbon atoms are preferably methyl groups, phenyl groups, or hydroxyl groups, where methyl groups or phenyl groups are particularly preferable.

Furthermore, 10 mol % or more, preferably 20 mol % or more, and more preferably 40 mol % or more of all substitution groups ($R^1$ and $R^2$) on all silicon atoms is the aforementioned fluoroalkyl group, and preferably a trifluoropropyl group. When the amount of the fluoroalkyl groups is less than the lower limit, the specific permittivity of a cured product obtained by curing the curable organopolysiloxane composition is reduced, and therefore is inappropriate.

In the formula, the value of e1 and e2 is the average degree of polymerization of the siloxane units in component (A), which is 0 or a positive number, and satisfies 5<e1+e2<148. Note that the value is the average degree of polymerization, and if component (A) is a mixture of two or more components, the average degree of polymerization e1+e2+2 of component (A) of the entire mixture is less than 150. The average degree of polymerization of the organopolysiloxane which is component (A) can be selected by the integral ratio of a peak intensity using $^{29}$Si NMR, and the preferred range of the average degree of polymerization is the same as described above.

Component (A) of the present invention may be one type of organopolysiloxane that satisfies the aforementioned requirements or may be a mixture of at least two types of organopolysiloxanes. For at least two types of organopolysiloxanes, the average degree of polymerization of a mixture thereof is preferably within the aforementioned range, and the organopolysiloxanes are more preferably an organopolysiloxane having 2 or more alkenyl groups with 2 to 12 carbon atoms in a molecule, and 10 mol % or more of all substitution groups on a silicon atom is the aforementioned fluoroalkyl group.

In component (A) of the present invention, the fluoroalkyl group may be a side chain or terminal of a molecular chain, but an organopolysiloxane having the fluoroalkyl group on a side chain, and having an alkenyl group with 2 to 12 carbon atoms on both terminals of a molecular chain, as expressed by the following average unit formula (II) is particularly preferable.

[Average unit formula]

$$R^{Vi}R^2{}_2Si(OSiR^2R^3)_eOSiR^{Vi}R^2{}_2 \quad (II)$$

In the formula, $R^{Vi}$ represents an alkenyl group with 2 to 12 carbon atoms, and examples include the same groups as described above.

$R^2$ represents the same group as described above, $R^3$ represents a fluoroalkyl group as expressed by $(C_pF_{2p+1})$—R— (where R represents the same group as above, and p represent the same number as above), and examples include the same groups as described above. Note that in the aforementioned structure, conditions where 10 mol % or more of all $R^{Vi}$s, $R^2$s, and $R^3$s is the aforementioned fluoroalkyl group ($R^3$) are automatically satisfied in a range where 5<e<148. In other words, e>5, and therefore, a value of $(R^3)=e/(2e+6)\times100$ mol % is greater than $5/16\times100=31.25$ mol %.

Preferably, $R^{Vi}$ is a vinyl group or hexenyl group, $R^2$ is a methyl group, phenyl group, or hydroxyl group, and the fluoroalkyl group is preferably a trifluoropropyl group.

In the formula, the value of e is the average degree of polymerization of a side chain siloxane unit in component (A), which is 0 or a positive number, and satisfies 5<e<148. Note that the value is the average degree of polymerization, and if component (A) is a mixture of two or more components, the average degree of polymerization e+2 of component (A) of the entire mixture is less than 150. The average degree of polymerization of the organopolysiloxane which is component (A) can be selected by the integral ratio of a peak intensity using $^{29}$Si NMR, and the preferred range of the average degree of polymerization is the same as described above.

Specific examples of component (A) of the present invention include double-terminated trimethsilyl-polydimethylmethyl vinylmethyl trifluoropropylsiloxane copolymers, double-terminated tirmethylsilyl-polymethyl vinylmethyl trifluoropropylsiloxane copolymers, double-terminated dimethylvinylsilyl-polydimethyl methylvinylmethyl trifluoropropylsiloxane copolymers, double-terminated dimethylvinylsilyl-polydimethylmethyl trifluoropropylsiloxane copolymers, double-terminated hydroxydimethylsilyl-polymethylvinylmethyl trifluoropropylsiloxane copolymers, double-terminated hydroxydimethylsilyl-polydimethylmethyl vinylmethyl trifluoropropylsiloxane copolymers, double-terminated dimethylphenylsilyl-polymethyl vinylmethyl trifluoropropylsiloxane copolymers, double-terminated dimethylphenylsilyl-polydimethylmethyl vinylmethyl trifluoropropylsiloxane copolymers, double-terminated dimethylvinylsilyl-polydimethylmethyl vinylmethyl phenylmethyl trifluoropropylsiloxane copolymers, double-terminated dimethylvinylsilyl-polymethyl phenylmethyl trifluoropropylsiloxane copolymers, double-terminated dimethylvinylsilyl-polydimethylmethyl phenylmethyl trifluoropropylsiloxane copolymers, double-terminated hydroxydimethylsilyl-polymethyl vinylmethyl phenylmethyl trifluoropropylsiloxane copolymers, double-terminated hydroxydimethylsilyl-polydimethylmethyl vinylmethyl phenylmethyl trifluoropropylsiloxane copolymers, double-terminated dimethylvinylsilyl-polymethyl trifluoropropylsiloxane, and the like.

The molecular weight distribution of component (A) of the present invention is as described above, and the organopolysiloxane may have a peak shape of the molecular weight distribution that is essentially monomodal, and an average degree of polymerization that is less than 150, or the organopolysiloxane may have a peak shape of the molecular weight distribution that is essentially multimodal (=having two or more peaks in the molecular weight distribution), and an average degree of polymerization that is less than 150. Furthermore, in the organopolysiloxane having the peaks of the aforementioned multimodal molecular weight distribution, an organopolysiloxane with an average degree of polymerization of 150 or more may be included so long as a mixture of the organopolysiloxane is an organopolysiloxane with an average degree of polymerization that is less than 150. Specifically, the entire component (A) which is a mixture obtained by combining an organopolysiloxane with a high average degree of polymerization and an organopolysiloxane with a low average degree of polymerization preferably has an average degree of polymerization that is less than 150.

More specifically, component (A) of the present invention may be the following component (A1) or component (A2).

Component (A1)

The component is an organopolysiloxane having at least two alkenyl groups with 2 to 12 carbon atoms in a molecule, where 10 mol % or more of all substitution groups on the silicon atoms is a fluoroalkyl group as expressed by $(C_pF_{2p+1})$—R— (where R represents an alkylene group with 1 to 10 carbon atoms, and p represents an integer from 1 to 8), the average degree of polymerization is less than 150, and the volume content rate of the organopolysiloxane having a degree of polymerization of 250 or more is less than 10%. Specific examples of the alkenyl group and the like are the same as described above. Herein, component (A1) is preferably only formed from one type or more organopolysiloxane containing a fluoroalkyl group with an average degree of polymerization that essentially does not exceed 150, and is preferably an essentially monomodal organopolysiloxane containing a fluoroalkyl group, having a peak of a single molecular weight distribution in a region where the average degree of polymerization is 150 or less, if the molecular weight distribution is measured. Furthermore, the volume content rate of the organopolysiloxane with a narrow width of the peak of the molecular weight distribution and a degree of polymerization that is 250 or more is less than 10%, less than 5%, or essentially not included (0%).

Component (A2)

The component is an organopolysiloxane containing a fluoroalkyl group, containing the following component (a1) and component (a2) with different molecular weight distribution and average degree of polymerization, where the average degree of polymerization of the entire mixture is less than 150:
(a1) an organopolysiloxane having at least two alkenyl groups with 2 to 12 carbon atoms in a molecule, where 10 mol % or more of all substitution groups on the silicon atoms is a fluoroalkyl group as expressed by $(C_pF_{2p+1})$—R— (where R represents an alkylene group with 1 to 10 carbon atoms, and p represents an integer from 1 to 8), and the average degree of polymerization is 200 or more; and
(a2) an organopolysiloxane having at least two alkenyl groups with 2 to 12 carbon atoms in a molecule, where 10 mol % or more of all substitution groups on the silicon atoms is a fluoroalkyl group as expressed by $(C_pF_{2p+1})$—R— (where R represents an alkylene group with 1 to 10 carbon atoms, and p represents an integer from 1 to 8), and the average degree of polymerization is 50 or less.

Herein, component (A2) is (a1) one type or more organopolysiloxane containing a fluoroalkyl group with an average degree of polymerization of 200 or more, and (a2) one type or more organopolysiloxane containing a fluoroalkyl group with an average degree of polymerization of 50 or less, and the entire body is a mixture of multimodal organopolysiloxanes containing a fluoroalkyl group, having a molecular weight distribution peak in a region where the average degree of polymerization is 50 or less and average degree of polymerization is 200 or more, when the molecular weight distribution is measured. Note that the average degree of polymerization of the entire mixture must be less than 150, and the preferred range of the average degree of polymerization as a whole is the same as described above.

The amount used of component (A) of the present invention is an amount 20 to 99 mass %, preferably 30 to 80 mass %, and more preferably 40 to 70 mass % with regard to the sum (total set to 100 mass %) of components (A) to (C). This is because when the amount is below the upper limit of the aforementioned range, the mechanical strength of a cured product formed by curing the present composition sufficiently increases, and when the amount is above the lower limit of the aforementioned range, the cured product preferably functions as an elastic gel layer with low pressure-sensitive adhesion.

Component (B)

Component (B) is a crosslinking agent of the composition of the present invention, and is an organohydrogen polysiloxane having at least two silicon-bonded hydrogen atom in a molecule. The organohydrogen polysiloxane may or may not have a fluorine atom, but is preferably an organohydrogen polysiloxane having a group containing a fluorine.

The molecular structure of the organohydrogen polysiloxane of component (B) is not particularly limited, and may be a straight chain, cyclic, resin, or straight chain having a partial branch, or may have a T unit (in other words, $YSiO_{3/2}$, where Y is a silicon-bonded hydrogen atom, monovalent organic group (including an organic group containing a fluorine atom), hydroxyl group, or alkoxy group) or a Q unit (in other words, $SiO_{4/2}$). Furthermore, the viscosity is also not particularly limited, and from the perspective of ease of handling, the viscosity at 25° C. is preferably within a range of 1 to 100,000 mPa·s when measured using a B type viscometer in accordance with JIS K7117-1. From the perspective of ease of mixing with component (A), the component is preferably a liquid at ambient temperature, and an organohydrogen polysiloxane with 2 to 300 silicon atoms is particularly preferable.

The siloxane unit have a silicon-bonded hydrogen atom is also not limited, and may be any unit of a $(R_2HSiO_{1/2})$ unit, $(RHSiO_{2/2})$ unit, or $(HSiO_{3/2})$ unit, but at least two silicon-bonded hydrogen atoms must by present in a molecule. Herein, R represents the same or different alkyl group with 1 to 12 carbon atoms, aryl group with 6 to 20 carbon atoms, aralkyl group with 7 to 20 carbon atoms, hydroxyl group, alkoxy group with 1 to 6 carbon atoms, or fluoroalkyl group as expressed by $(C_pF_{2p+1})$—R— (where R represents the same groups as above, and p represents the same numbers above), which can be used in the organopolysiloxane (A).

The organohydrogen polysiloxane as component (B) has in a molecule a group containing a fluorine, preferably the aforementioned fluoroalkyl group, and particularly preferably a trifluoropropyl group, from the perspective of affinity between component (A) and improving the specific permittivity of a cured product obtained by curing the curable composition of the present invention. The amount of the fluoroalkyl groups is not particularly limited, but 5 to 75 mol % of an organic group containing a fluorine atom, more preferably 5 to 70 mol %, and even more preferably 10 to 60 mol % is provided in a molecule in all of the organic bases.

Preferred examples of component (B) include resin organopolysiloxanes containing a M unit (in other words, $R^6_3SiO_{1/2}$) and T unit ($R^6SiO_{3/2}$), linear organopolysiloxanes containing a M unit and D unit ($R^6_2SiO_{2/2}$), and resin organopolysiloxanes containing a M unit, D unit, and T unit or Q unit. Examples of the organopolysiloxanes containing a M unit and T unit include organopolysiloxanes where a portion or all $R^6$s in the M unit are hydrogen atoms, and a portion or all $R^6$s in the T unit are organic groups containing a fluorine atom, such as an organopolysiloxane having a 3,3,3-trifluoropropyl group for example. Examples of the organopolysiloxanes containing a M unit and D unit include organopolysiloxanes where at least a portion of $R^6$s in the M unit are hydrogen atoms, and a portion or all of the $R^6$ in the D unit are the aforementioned fluoroalkyl groups, and a particular example includes an organopolysiloxane having a 3,3,3-trifluoropropyl group. Examples of the organopolysiloxanes containing a M unit, D unit, and T unit include organopolysiloxanes where a portion or all $R^6$s in the M unit are hydrogen atoms, and a portion or all $R^1$s in the D unit and T unit are the aforementioned fluoroalkyl groups, such as a 3,3,3-trifluoropropyl group for example.

Specific examples include double-terminated trimethylsilyl-polydimethylmethyl hydrogen siloxane copolymers, double-terminated trimethylsilyl-polymethyl hydrogen siloxanes, double-terminated trimethylsilyl-polydimethylmethyl hydrogen methyl trifluoropropyl siloxane copolymers, double-terminated trimethylsilyl-polymethyl hydrogen methyl trifluoropropyl siloxane copolymers, double-terminated dimethyl hydrogensilyl-polydimethylmethyl hydrogen siloxane copolymers, double-terminated dimethyl hydrogensilyl-polydimethyl siloxanes, double-terminated dimethyl hydrogensilyl-polydimethylmethyl trifluoropropyl siloxane copolymers, double-terminated dimethyl hydrogensilyl-polymethyl hydrogen methyl trifluoropropyl siloxane copolymers, double-terminated dimethyl hydrogensilyl-polydimethylmethyl hydrogen methyl trifluoropropyl siloxane copolymers, double-terminated dimethyl hydrogensilyl-polymethyl trifluoropropyl siloxanes, double-terminated hydroxy dimethylsilyl-polymethyl hydrogen siloxanes, double-terminated hydroxy dimethylsilyl-polymethyl hydrogen methyl trifluoropropyl siloxane copolymers, double-terminated hydroxy dimethylsilyl-polydimethylmethyl hydrogen methyl trifluoropropyl siloxane copolymers, double-terminated dimethyl phenylsilyl-polymethyl hydrogen siloxanes, double-terminated dimethyl phenylsilyl-polymethyl hydrogen methyl trifluoropropyl siloxane copolymers, double-terminated dimethyl phenylsilyl-polydimethylmethyl hydrogen methyl trifluoropropyl siloxane copolymers, double-terminated dimethyl hydrogensilyl-polydimethyl methylphenyl siloxane copolymers, double-terminated dimethyl hydrogensilyl-polydimethyl methylphenylmethyl trifluoropropyl siloxane copolymers, double-terminated dimethyl hydrogensilyl-polymethyl phenylmethyl trifluoropropyl siloxane copolymers, double-terminated hydroxy dimethylsilyl-polymethyl hydrogen methylphenyl siloxane copolymers, double-terminated hydroxy dimethylsilyl-polymethyl hydrogen methylphenylmethyl trifluoropropyl siloxane copolymers, double-terminated dimethyl trifluoropropylsilyl-polydimethylmethyl hydrogen siloxane copolymers, double-terminated dimethyl trifluoropropylsilyl-polymethyl hydrogen siloxanes, dimethylmethyl hydrogen cyclopolysiloxanes, methyl hydrogen cyclopolysiloxanes, methyl hydrogen methyl trifluoropropyl cylcopolysiloxanes, dimethylmethyl hydrogen methyl trifluoropropyl cyclopolysiloxanes, methylphenylmethyl hydrogen methyl trifluoropropyl cyclopolysiloxanes, 1,1,3,5,5-pentamethyl-3-trifluoropropyl trisiloxanes, tris (dimethyl siloxysilyl) trifluoropropylsilanes, polysiloxanes containing a ($Me_3SiO_{1/2}$) unit, ($Me_2HSiO_{1/2}$) unit, and ($SiO_{4/2}$) unit, polysiloxanes containing a ($Me_2HSiO_{1/2}$) unit and ($SiO_{4/2}$) unit, polysiloxanes containing a ($Me_3SiO_{1/2}$) unit, ($Me_2HSiO_{1/2}$) unit, and ($TfpSiO_{3/2}$) unit, polysiloxanes containing a ($Me_2HSiO_{1/2}$) unit and ($TfpSiO_{3/2}$) unit, polysiloxanes containing a ($Me_3SiO_{1/2}$) unit, ($MeHSiO_{2/2}$) unit, and ($TfpSiO_{3/2}$) unit, polysiloxanes containing a ($Me_2HSiO_{1/2}$) unit, ($MeHSiO_{2/2}$) unit, and ($TfpSiO_{3/2}$) unit, polysiloxanes containing a ($Me_2HSiO_{1/2}$) unit, ($TfpSiO_{3/2}$) unit, and ($MeSiO_{3/2}$) unit, polysiloxanes containing a ($Me_2HSiO_{1/2}$) unit, ($TfpSiO_{3/2}$) unit, and ($PhSiO_{3/2}$) unit, polysiloxanes containing a ($Me_2HSiO_{1/2}$) unit and ($PhSiO_{3/2}$) unit, polysiloxanes containing a ($Me_2HSiO_{1/2}$) unit, ($TfpSiO_{3/2}$) unit, and ($SiO_{4/2}$) unit, and the like. These can be used independently or may be a mixture of at least two organopolysiloxanes. Herein, Me represents a methyl group, Ph represents a phenyl group, and Tfp represents a trifluoropropyl group.

In the present invention, a preferred component (B) is a straight chain organohydrogen polysiloxane, and particular examples include organohydrogen polysiloxanes as expressed by the following average unit formula (III) or (IV).

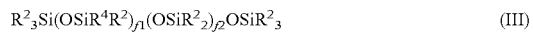

$$R^2_3Si(OSiR^4R^2)_{f1}(OSiR^2_2)_{f2}OSiR^2_3 \quad (III)$$

$$(HR^2_2SiO_{1/2})_{f3}(R^5SiO_{3/2})_{f4} \quad (IV)$$

In the formula, $R^4$ represents a fluoroalkyl group as expressed by ($C_pF_{2p+1}$)—R— (where R represents the same group as above, and p represents the same number as above) or a silicon-bonded hydrogen atom. Examples of the fluoroalkyl group include the same groups as described above, and trifluoropropyl groups are preferable. $R^2$ represents the same group as above, which is a methyl group, phenyl group, or hydroxyl group. Furthermore, in the formula, of all $R^4$s, at least two are silicon-bonded hydrogen atoms, and f1 and f2 represent 0 or a positive number, and are numbers that satisfy $5<f1+f2<148$. More preferably, $R^2$ represents a methyl group, f1 is a number within a range of $10<f1+f2<100$, of all $R^4$s, at least 5 mol % or more is the aforementioned fluoroalkyl group, and the remaining $R^4$s are preferably silicon-bonded hydrogen atoms.

In the formula, $R^5$ represents a fluoroalkyl group as expressed by ($C_pF_{2p+1}$)—R— (where R represents the same group as above, and p represents the same number as above), $R^2$ represents the same group as above, f3 and f4 represent a positive number, and f3+f4 is a number where the weight average molecular weight of the organohydrogen polysiloxane as expressed by formula (IV) is within a range of 400 to 10,000.

Component (B) of the present invention can be manufactured by a conventionally known manufacturing method such as a reaction including ring-opening polymerization or a reaction at least including hydrolysis and a condensation reaction, of alkoxy silanes, chlorosilanes, or siloxanes having an organic group containing or not containing a fluorine atom and/or reactive functional group, in the presence or absence of an acid, basic compound, or both. In particular, component (B) having a fluoroalkyl group can be manufactured by a method including a ring-opening polymerization reaction or method at least including hydrolysis and a condensation reaction using alkoxysilanes having a fluoroalkyl group as raw material.

The amount of component (B) used in the composition of the present invention is an amount where the silicon-bonded hydrogen atoms in the present component is 0.1 to 1.0 mols with regard to 1 mol of the total amount of alkenyl groups in component (A). When the amount of component (B) used is less than the aforementioned lower limit, curing of the present composition may be insufficient. On the other hand, when the amount of component (B) used exceeds the aforementioned upper limit, an elastic gel may not be obtainable when curing the composition of the present invention, and thus a gel-like cured product or elastomer-like cured product exhibiting a low pressure-sensitive adhesive force, a high compression ratio, and favorable recovery properties may not be obtained. A more preferable amount of component (B) used is an amount where silicon-bonded hydrogen atom in the component is 0.2 to 0.80 mols, 0.25 to 0.75 mols, and more preferably 0.35 to 0.75 mols, with regard to a total amount of 1 mol of alkenyl groups in component (A).

Component (C)

A hydrosilylation reaction catalyst which is component (C) is not limited to a specific catalyst, so long as a hydrosilylation reaction can be promoted. Many metals and compounds are known thus far as hydrosilylation reaction catalysts, which can be appropriately selected and used in the present invention. Specific examples of the hydrosilylation reaction catalyst can include fine particulate platinum adsorbed on silica fine powder or a carbon powder carrier, chloroplatinic acids, alcohol-modified chloroplatinic acids, olefin complexes of a chloroplatinic acid, coordinate compounds of a chloroplatinic acid and vinyl siloxane, platinum black, palladium, and rhodium catalysts.

The amount of the hydrosilylation reaction catalyst used is not particularly limited, so long as the amount is an effective amount and an amount that promotes curing of the curable organopolysiloxane composition of the present invention. Specifically, metal atoms in the catalyst are 0.01 to 1,000 ppm by mass unit with regard to the sum (total amount set to 100 mass %) of components (A) to (C), and preferably, platinum metal atoms in component (C) are within a range of 0.1 to 500 ppm. This is because when the amount of component (C) is less than the lower limit of the aforementioned range, curing may be insufficient, and when the amount exceeds the upper limit of the aforementioned range, coloring or the like and transparency of an obtained cured product may be adversely affected in addition to being uneconomical.

Solvent (D)

The curable organopolysiloxane composition containing a fluoroalkyl group of the present invention can be provided as is to a curing reaction, but on the other hand, if the composition is in a solid form or viscous liquid form, miscibility and handling is improved, and therefore, an organic solvent can be used if necessary. In particular, if the curable organopolysiloxane composition containing a fluoroalkyl group of the present invention is coated in a film form, the viscosity is preferably adjusted using a solvent within a range where the entire viscosity is 100 to 100,000 mPa·s, and if diluting with a solvent, the solvent can be used within a range of 0 to 2000 parts by mass with regard to the sum (100 parts by mass) of components (A) to (C). In other words, in the present invention composition, solvent (D) may be 0 parts by mass. In particular, the curable organopolysiloxane composition containing a fluoroalkyl group of the present invention has advantages where in order to select a polymer with a low degree of polymerization, a solvent-free design is possible, and fluorine-based solvents, organic solvents, and the like do not remain in the film obtained by curing, and thus environmental load problems and influence of the solvent on electronic devices can be resolved.

So long as the organic solvent used herein is a compound that can dissolve a portion of components or all components in the composition, the type is not particularly limited, and a solvent with a boiling point from 80° C. to 200° C. is preferably used. Examples include i-propyl alcohol, t-butyl alcohol, cyclohexanol, cyclohexanone, methyl ethyl ketone, methyl isobutyl ketone, toluene, xylene, mesitylene, 1,4-dioxane, dibutyl ether, anisole, 4-methyl anisole, ethyl benzene, ethoxy benzene, ethylene glycol, ethylene glycol dimethyl ether, ethylene glycol diethyl ether, 2-methoxy ethanols (ethylene glycol monomethyl ethers), diethylene glycol dimethyl ether, diethylene glycol monomethyl ether, 1-methoxy-2-propyl acetate, 1-ethoxy-2-propyl acetate, octamethyl cyclotetrasiloxane, hexamethyl disiloxane, and other non-halogen solvent, trifluoromethyl benzene, 1,2-bis (trifluoromethyl) benzene, 1,3-bis (trifluoromethyl) benzene, 1,4-bis (trifluoromethyl) benzene, trifluoromethyl chlorobenzene, trifluoromethyl fluorobenzene, hydrofluoroether, and other halogen solvents. The organic solvent can be used independently or as a mixture of two or more types thereof. As the amount of fluoroalkyl groups in the curable composition increases, the usage ratio of the halogen solvents must increase.

The amount of the organic solvent used herein is preferably within a range of 0 to 2,000 parts by mass, and more preferably 5 to 500 or 10 to 300 parts by mass when the sum of components (A) to (C) is set to 100 parts by mass.

The viscosity at 25° C. of the present composition is not particularly limited, but is preferably with a range of 100 to 100,000 mPa·s, more preferably 300 to 10,000 mPa·s, and particularly preferably within a range of 1,000 to 8,000 mPa·s. The amount of the organic solvent used can be adjusted in order to set to a preferred viscosity range.

In addition to the aforementioned components, components other than those described above can be added and mixed if necessary to the curable organopolysiloxane composition containing a fluoroalkyl group of the present invention, so long as an object of the present invention is not impaired. Examples of other components include hydrosilylation reaction suppressants, releasing agents, insulation additives, adhesion improving agents, heat resistance improving agents, fillers, pigments, and other various conventionally known additives. For example, an inorganic filler can be added in order to adjust the entire viscosity or to improve functionality such as improving dielectric properties or the like.

The hydrosilylation reaction suppressant is added in order to suppress a crosslinking reaction that occurs between component (A) and component (B), extend the usable time at ambient temperature, and improve the storage stability. Therefore, for the curable composition of the present invention, the suppressant is a component that is inevitably added in practice.

Examples of the hydrosilylation reaction suppressant include acetylene compounds, enyne compounds, organic nitrogen compounds, organic phosphorus compounds, and oxime compounds. Specific examples include: 3-methyl-1-butyne-3-ol, 3,5-dimethyl-1-hexyne-3-ol, 3-methyl-1-pentyne-3-ol, 1-ethynyl-1-cyclohexanol, phenyl butynol, and other alkyne alcohols; 3-methyl-3-pentene-1-yne, 3,5-dimethyl-1-hexyne-3-yne, and other enyne compounds; 1,3,5,7-tetramethyl-1,3,5,7-tetravinyl cyclotetrasiloxane, 1,3,5,7-tetramethyl-1,3,5,7-tetrahexenyl cyclotetrasiloxane, and other methyl alkenyl cyclosiloxanes; and benzotriazoles.

The blending amount of the hydrosilylation reaction suppressant is an effective amount for extending the usable time of the curable organopolysiloxane composition of the present invention at ambient temperature, and improving storage stability. Normally, the amount is within a range of 0.001 to 5 mass %, and preferably within a range of 0.01 to 2 mass % per 100 mass % of component (A), but may be appropriately selected based on the type of the present component, amount and performance of a platinum catalyst, amount of alkenyl groups in component (A), amount of silicon-bonded hydrogen atoms in component (B), and the like.

A film-shaped or sheet-shaped cured product obtained by curing the curable organopolysiloxane composition containing a fluoroalkyl group of the present invention can be preferably used in an electroactive film (dielectric layer or electrode layer) configuring a transducer, but when the releasability of the cured layer when forming a thin film is inferior, and particularly when a dielectric film is manufactured at a high rate, the dielectric film may be damaged due to mold separation. Furthermore, in order to improve pressure sensitivity under low pressure for a dielectric layer used in a touch panel or the like, reduced adhesion may be required. The curable organopolysiloxane composition containing a fluoroalkyl group of the present invention can improve the manufacturing rate of a film without damaging the film, and may be able to further reduce pressure-sensitive adhesion by adding another releasing agent.

Examples of releasability improving additives (=releasing agents) that can be used in the curable organopolysiloxane composition containing a fluoroalkyl group of the present invention include carboxylic acid-based releasing agents, ester-based releasing agents, ether-based releasing agents, ketone-base releasing agents, alcohol-based releasing agents, and the like. One type of the releasing agents may be used independently, or two or more types may be used in combination. Furthermore, releasing agents that contain a silicon atom, releasing agents that do not contain a silicon atom, or a mixture thereof can be used as the releasing agent. Specific examples thereof are the same as in Patent Literature 1 (WO 2014-105959).

An insulation breakdown properties improving agent is preferably an electrical insulating properties improving agent, and can be selected from a group consisting of aluminum or magnesium hydroxides or salts, clay minerals, and mixtures thereof, which specifically include aluminum silicates, aluminum sulfates, aluminum hydroxides, magnesium hydroxides, baked clays, montmorillonites, hydrotalcites, talcs, and mixtures thereof. Furthermore, the insulating properties improving agents may be treated by a conventionally known surface treating method. Specific examples thereof are the same as in Patent Literature 1 (WO 2014-105959).

The adhesion improving agent improves adhesion to a substrate which the curable organopolysiloxane composition containing a fluoroalkyl group of the present invention contacts during curing. The additive is effective when a dielectric layer which is a cured product of the composition is not re-peeled. Examples of the adhesion improving agent include vinyl triethoxysilanes, allyl trimethoxysilanes, allyl triethoxysilanes, 3-glycidoxypropyl trimethoxysilanes, 3-methacryloxypropyl trimethoxysilanes, and other organic functional alkoxysilane compounds, and siloxane derivatives thereof, and particularly chain or three-dimensional resin siloxane derivatives substituted with an organic group containing fluorine. Note that if low pressure-sensitive adhesion is required for the curable organopolysiloxane composition containing a fluoroalkyl group of the present invention, an adhesion improving agent is preferably not added.

Examples of other arbitrary components include: phenolic-based, quinone-based, amine-based, phosphorus-based, phosphite-based, sulfur-based, thioether-based antioxidants, and other antioxidants; triazole-based, benzophenone-based light stabilizers, and other light stabilizers; phosphate ester-based halogen-based, phosphorus-based, antimony-based, flame retardants, and other flame retardants; antistatic agents containing at least one type of cationic surfactant, anionic surfactant, nonionic surfactant; dyes and pigments; and the like, so long as the technical effects of the present invention are not impaired.

In the composition according to the present invention, the filler may be used or not used as desired. If a filler is used, an inorganic filler, organic filler, or both can be used. The type of filler to be used in not particularly limited, and examples include high dielectric fillers, conductive fillers, insulating fillers, and reinforcing fillers, where one or more type thereof can be used. In particular, the composition of the present invention can contain at least one type of filler selected from a group consisting of high dielectric fillers, conductive fillers, insulating fillers, and reinforcing fillers in order to adjust the viscosity or provide functionality, within a range that does not impair the transparency, coatability, and handling workability thereof. A portion of or all fillers may be surface treated by at least one type of surface treating agent.

The filler may be one type or two or more types, and the shape thereof is not particularly limited, and can be particulate, plate-shaped, needle-shaped, fibrous, or other arbitrary shape. If the filler shape is particulate, the particle size of the filler is not particularly limited, but the volume average particle size thereof can be within a range of 0.001 to 500 µm when measured by a laser light diffracting method. Furthermore, the volume average particle size of the filler can be 300 µm or less, 200 µm or less, 100 µm or less, 10 µm or less and 0.01 µm or more, 0.1 µm or more, and 1 µm or more, based on the use of the filler. If the shape of the filler is anisotropic such as a plate shape, needle shape, fibrous shape, or the like, the aspect ratio of the filler can be 1.5 or more, 5 or more, or 10 or more. When using fine particles with volume average particle size of 0.01 µm or less and maximum particle size of 0.02 µm or less, a cured product, and particularly a dielectric layer film with substantially high transparency can be manufactured.

The curable organopolysiloxane composition containing a fluoroalkyl group of the present invention can be prepared by uniformly mixing components (A) to (C), and adding another arbitrary component if necessary and then uniformly mixing. Various stirrers or kneaders are preferably used to mix at ambient temperature, but if the combination of components do not cure during mixing, mixing under heat may be performed.

The blending order of the components is not particularly limited so long as curing does not occur during mixing. When not immediately used after mixing, the components are preferably stored separately in a plurality of containers such that component (A) and component (C) are not present in the same container, and then the components in all containers are mixed immediately before use.

A curing reaction of the curable organopolysiloxane composition containing a fluoroalkyl group of the present invention is normally achieved by exposing the composition to heat or active energy rays. The heat curing reaction temperature is not particularly limited, but is preferably 50° C. to 200° C., more preferably 60° C. to 200° C., and even more preferably 80° C. to 180° C. Furthermore, the time spent on the curing reaction is dependent on the structures of components (A), (B), and (C), but is normally 1 second to 3 hours. In general, a cured product can be obtained by maintaining for 10 seconds to 30 minutes within a range of 90 to 180° C.

Examples of the active energy rays that can be used in a curing reaction include ultraviolet rays, electron beams, radiation, and the like, but ultraviolet rays are preferred from the perspective of practicality. If a curing reaction is performed using ultraviolet rays, a hydrosilylation reaction catalyst having high activity with regard to used ultraviolet rays, such as bis (2,4-pentanedionato) platinum complexes and (methylcyclopentadienyl) trimethyl platinum complexes, is preferably added. High-pressure mercury lamps, medium-pressure mercury lamps, Xe—Hg lamps, deep UV lamps, and the like are preferred as the generation source of ultraviolet rays, and the amount of irradiation thereof at this time is preferably 100 to 8,000 mJ/cm$^2$.

The cured product of the present invention is formed by curing the aforementioned curable organopolysiloxane composition containing a fluoroalkyl group. The form of the cured product is not particularly restricted, and examples include sheets, films, and tapes. In particular, the curable organopolysiloxane composition containing a fluoroalkyl group has a high curing rate, and favorable processability for manufacturing a molded product such as a film or the like, and thus a cured product with a desired thickness and shape can be efficiently produced.

The cured product is a gel or elastomer with a low pressure-sensitive adhesive force and excellent balance between elasticity and viscosity, and because the specific permittivity is high, compression ratio is high, and recovery properties are favorable, when the product is used in a middle layer between a substrate, remarkable physical properties are provided where pressure responsiveness is excellent and the properties are maintained over a long period of time.

Use as Dielectric Layer

The cured product of the present invention can be particularly essentially used as a transparent dielectric layer. Herein, substantially transparent means that a film-shaped cured product with a thickness of 10 to 1000 µm is visually transparent, and a light transmittance at a 450 nm wavelength is generally 80% or higher if the air value is set at 100%.

The curable organopolysiloxane composition containing a fluoroalkyl group according to the present invention can be coated on a film-shaped substrate, tape-shaped substrate, or sheet-shaped substrate (hereinafter, referred to as "film-shaped substrate"), and then cured by heating under the aforementioned temperature conditions to form a dielectric film/dielectric sheet on a surface of the substrate. The cured layer, and particularly a film-shaped dielectric layer, formed by curing the curable organopolysiloxane composition containing a fluoroalkyl group according to the present invention is preferably used to construct and use a laminated touch screen or flat panel display.

Examples of the type of substrate include paper, cardboard paper, clay coated paper, polyolefin laminate paper, and particularly polyethylene laminate paper, synthetic resin films/sheets, natural fibrous materials, synthetic fibrous materials, artificial leather materials, and metal foils. Synthetic resin films/sheets are particularly preferred, and examples of synthetic resins include polyimides, polyethylenes, polypropylenes, polystyrenes, polyvinyl chlorides, polyvinylidene chlorides, polycarbonates, polyethylene terephthalates, and nylons. In particular, if heat resistance is required, a film of a polyimide polyether ether ketone, polyethylene naphthalate (PEN), liquid crystal polyacrylate, polyamide imide, polyether sulfone, and other heat resistant synthetic resins are preferred. On the other hand, for an application in which visibility of the display device or the like is required, a transparent material, and specifically polypropylene, polystyrene, polyvinylidene chloride, polycarbonate, polyethylene terephthalate, PEN, and other transparent materials are preferred.

The substrate is preferably film-shaped or sheet-shaped. The thickness thereof is not particularly limited, but is normally approximately 5 to 500 µm. Furthermore, in order to improve bonding between a supporting film and the cured layer of the present invention, a primer treated, corona treated, etched, or plasma treated supporting film may be used. Herein, from the perspective of improving bonding of the cured layer of the present invention, a primer treatment is particularly preferably performed using the aforementioned adhesion improving agent (siloxane derivative or the like). Furthermore, an opposite surface from the cured layer surface of the present invention of the film-shaped substrate may be surface treated with a scratch resistance, grime resistance, fingerprint attachment resistance, antiglare, antireflection, antistatic, or other treatment or the like.

Examples of the method of coating onto a substrate include gravure coating, offset coating, offset gravure coating, roll coating using an offset transfer roll coater or the like, reverse roll coating, air knife coating, curtain coating using a curtain flow coater or the like, comma coating, Meyer bar coating, and other methods used for forming a conventionally known cured layer, which can be used without limitation.

The coating amount is set based on the application, but in particular, if the layer is used as a transparent dielectric layer, the thickness of the layer obtained after curing may be 1 to 1,000 µm, 20 to 900 µm, or 100 to 800 µm.

If the cured layer formed by curing the curable organopolysiloxane composition containing a fluoroalkyl group of the present invention is a dielectric layer, and particularly a substantially transparent dielectric film, the cured layer is preferably handled as a laminate body film adhered in a peelable condition on a film substrate provided with a peeling layer having peeling coating performance.

The cured product formed by curing the curable organopolysiloxane composition containing a fluoroalkyl group of the present invention is useful as an electronic material, member for a display device, or member for a transducer (including for sensors, speakers, actuators, and generators), and a preferred application for the cured product is an electronic component or display device member. In particular, a film-shaped cured product, and particularly a substantially transparent dielectric film is preferred as a display panel or member for a display, and is particularly useful as so-called touch panel application that can operate an apparatus, and particularly an electronic apparatus by touching a screen with a finger or the like.

Touch Panel or Member for Display

The cured product of the curable organopolysiloxane composition containing a fluoroalkyl group of the present invention can be used to construct or use a laminate touch screen or flat panel display, and a conventionally known method of using a dielectric layer or pressure-sensitive adhesive layer can be used without particular limitation as a specific use method.

For example, the cured product formed by curing the curable organopolysiloxane composition containing a fluoroalkyl group can be used for manufacturing a display device such as a touch panel or the like as an optically transparent silicone-based layer disclosed in the Japanese PCT Patent Application 2014-522436, Japanese PCT Patent Application 2013-512326, and the like. For example, the cured product formed by curing the curable organopolysiloxane composition containing a fluoroalkyl group of the present invention can be diverted in pressure-sensitive adhesion applications, and can be used as the pressure-sensitive adhesive layer or pressure-sensitive adhesive film described in Japanese PCT Patent Application 2013-512326 without particular limitation.

As one example, a touch panel according to the present invention may be a touch panel including a cured layer formed by curing the curable organopolysiloxane composition of the present invention, adhered to a substrate such as a conductive plastic film or the like on which a conductive layer is formed on one surface, and to a surface on a side or opposite side from which the conductive layer is formed. The substrate if preferably a sheet-shaped or film-shaped substrate, and examples include resin films and glass plates. Furthermore, the conductive plastic film may be a resin film or glass plate, and particularly a polyethylene terephthalate, on which an ITO layer is formed on one surface. These are disclosed in the aforementioned Japanese PCT Patent Application 2013-512326 and the like. Note that from the perspective of improving bonding of the cured layer of the present invention, a primer treatment is particularly preferably performed on the substrates using the aforementioned adhesion improving agent (siloxane derivative or the like).

Furthermore, the cured product formed by curing the curable organopolysiloxane composition containing a fluoroalkyl group of the present invention may be used as an adhesive film for a polarizing plate used in manufacturing a display device such as a touch panel or the like, or may be used as a pressure-sensitive adhesive layer used in lamination between a display module and touch panel described in Japanese Unexamined Patent Application Publication No. 2013-065009.

INDUSTRIAL APPLICABILITY

An application of the curable organopolysiloxane composition containing a fluoroalkyl group of the present invention and cured product formed by curing the composition is not limited in any way except as described above, and a dielectric layer film provided with a cured product formed by curing the curable organopolysiloxane composition containing a fluoroalkyl group of the present invention can be used in television receivers, computer monitors, portable information terminal monitors, observation monitors, video cameras, digital cameras, cellular phones, portable information terminals, displays used for meter panels of an automobile and the like, displays used for meter panels of various types of equipment, devices, and apparatuses, automatic ticket sales machines, ATMs, and the like, and various types of flat panel displays (FPD) for the display of text, symbols, or images. Examples of devices include display devices such as CRT displays, liquid crystal displays, plasma displays, organic EL displays, inorganic EL displays, LED displays, surface-conduction electron-emitter displays (SED), field emission displays (FED), or the like, and use is possible for touch panels using the display devices. The film of the present invention is used to prevent damage to the surface of the display, prevent contamination, prevent attachment of fingerprints, prevent static electricity, prevent reflection, and prevent people from peeping at the display.

EXAMPLES

The present invention will be described below using examples, but the present invention is not limited thereto. The following compounds were used in the examples described below.

Component (a1): Double-terminated vinyl dimethylsiloxy group block, 3,3,3-trifluoropropyl methylsiloxane polymer (siloxane degree of polymerization: 229, Amount of fluoroalkyl groups: 50 mol %)

Component (a2): Double-terminated vinyl dimethylsiloxy group block, 3,3,3-trifluoropropyl methylsiloxane polymer (siloxane degree of polymerization: 33, Amount of fluoroalkyl groups: 50 mol %)

Component (a3): Double-terminated vinyl dimethylsiloxy group block, 3,3,3-trifluoropropyl methylsiloxane-dimethylsiloxane copolymer (siloxane degree of polymerization: 90, 3,3,3-trifluoropropyl methylsiloxane units: 67, Dimethylsiloxane units: 19, Amount of fluoroalkyl groups: 38 mol %)

Component (a4): Double-terminated vinyl dimethylsiloxy group block, 3,3,3-trifluoropropyl methylsiloxane siloxane polymer (siloxane degree of polymerization: 148, Amount of fluoroalkyl groups: 49 mol %)

Component (B1): Double-terminated methyl blocked 3,3,3-trifluoropropyl methyl hydrosiloxane copolymer (siloxane degree of polymerization: 12, Amount of fluoroalkyl groups: 15 mol %)

Component (B2): Double-terminated dimethyl hydrosiloxy group block, 3,3,3-trifluoropropyl methylsiloxane polymer (siloxane degree of polymerization: 10, Amount of fluoroalkyl groups: 38 mol %)

Component (B3): $M^H_{1.3}T^{F3Pr}$ (MW=1.11×103) configured from a dimethyl hydrosiloxy unit ($M^H$ unit) and a $T^{F3Pr}$ unit (trifunctional siloxy unit) having a 3,3,3-trifluoropropyl group Note that the weight average molecular weight (MW) of component (B3) is a weight average molecular weight as calculated by polystyrene measured by GPC (gel permeation chromatography), using tetrahydrofuran (THF) in a solvent.

Component (C1): Platinum-divinyl tetramethyl disiloxane complex (approximately 0.6 wt. % based on platinum concentration)

Component (C2): Platinum-double-terminated dimethyl vinylsiloxy group block, 3,3,3-trifluoropropyl methylsiloxane complex (siloxane degree of polymerization: 3, 0.5 wt % based on platinum concentration)

Component (D): Bistrifluoromethyl benzene
Hydrosilylation Reaction Suppressant
Component (E1): 1,3,5,7-tetramethyl-1,3,5,7-tetravinyl cyclotetrasiloxane
Component (E2): 3-methyl-butyn-3-ol Components (a1) and (a2) and component (B1), (C1), and (E1) were used in Examples 1 through 8 described below. The silicon-bonded hydrogen atoms (Si—H) of component (B1) were used at an amount of 0.42 to 0.49 mols per 1 mol of vinyl groups. Examples 9 through 15 were the same as Examples 1 through 8 except that the silicon-bonded hydrogen atoms (Si—H) of component (B1) were used at an amount of 0.50 mols per 1 mol of vinyl groups. In example 16, component (a3) and components (B2), (B3), (C2), and (E2) were used, and the silicon-bonded hydrogen atom (Si—H) of components (B2) and (B3) was an amount of 0.50 mols per 1 mol of vinyl groups. In example 17, component (a4) and components (B1), (C2), and (E1) were used, and the silicon-bonded hydrogen atom (Si—H) of component (B1) was an amount of 0.50 mols per 1 mol of vinyl groups. Note that a main chain of component (B1) is configured of an average of four 3,3,3-trifluoropropyl methylsiloxane units and six methyl hydrosiloxane units in one molecule.

Measurement Method of Physical Properties of Obtained Material (1) Measurement of Pressure-Sensitive Adhesive Force An automatic coating machine (PI-1210 manufactured by Tester Sangyo) was used to apply a liquid material onto a PET substrate (thickness: 50 μm; Lumirror S10 manufactured by Toray) such that the thickness of the cured product was approximately 100 μm.

In Examples 1 through 8, curing was performed for 15 minutes at 150° C. thereafter.

In Examples 9 through 17, curing was performed for 15 minutes at 80° C., and then for 15 minutes at 150° C.

The PET substrate (thickness: 50 μm) was laminated onto the cured film material to prepare a test piece. Measurements were performed in a 50% humidity environment and performed at 180° peel at a rate of 300 mm/min (RTC-1210 manufactured by Orientec). However, when the viscosity was high, component (D) was added to adjust the viscosity. In this case, the material was left to stand for approximately 30 to 60 minutes at 70° C., and then cured for 15 minutes at 150° C.

(2) Measurement of Compression Performance.

A film was prepared similarly to measurement of the pressure-sensitive adhesive force. However, the coating amount of the liquid material was adjusted such that the thickness of the cured product was approximately 300 μm. Furthermore, when the viscosity is high, the material was left to stand approximately for one night or approximately 30 to 60 minutes at 70° C., and then cured for 15 minutes at 150° C. Measurements were performed at room temperature using a Texture Analyzer TA. XT Plus (manufactured by EKO Instruments). A flat probe (6 mm diameter) was lowered at a rate of 0.17 mm per second, and after reaching a maximum compressive force of 5 N, the compressive force was removed. Measurements were performed a total of 8 times. The compression ratio was measured in accordance with the following equation, based on the thickness (T0) of an initial film sample and the thickness (T1) after compressing. Note that for Example 7 and Comparative Example 2, FIG. 1 and FIG. 2 show recording curves of the strain-compressive force according to the aforementioned 8 measurements.

$$\text{Compression ratio (\%)}=(T0-T1)/T0\times100$$

Furthermore, the thickness (T2) of the film sample after returning the probe to an original position at a rate of 0.17 mm per second was measured, and then measured as the compression residual strain in accordance with the following equation.

$$\text{Compression residual strain (\%)}=(T0-T2)/(T0-T1)\times100$$

(3) Dielectric Constant Measurement

The dielectric constant was measured using a LCR 6530 P manufactured by Wayne Kerr. Measurements were performed using an approximately 1 mm thick film-shaped sample cured by the same method as the aforementioned 2, other than using PET (FL50-3 manufactured by Japan Electronics Technology) in the substrate. Note that the value of the dielectric constant indicates a value at a frequency of 1 kHz.

(4) Transparency

If no cloudiness is visually observed on the cured product sheet, the product was evaluated as "transparent".

Examples 1 Through 15

Solvent-free type and solvent type curable organopolysiloxane compositions were prepared in compositions shown in Table 1, using the aforementioned components. Furthermore, the amount of solvent (D) actually used was recorded in the table. Herein, the average degree of polymerization of component (A) was calculated by the following equation.

$$1/[(WT_{a1}/DP_{a1})+(WT_{a2}/DP_{a2})]$$

Herein, $WT_{a1}$ represents the weight ratio of component (a1) in component (A), $WT_{a2}$ represents the weight ratio of component a2 in component (A), $DP_{a1}$ represents the degree of polymerization of component (a1), and $DP_{a2}$ represents the degree of polymerization of component (a2).

The various physical properties of the obtained cured product are collectively shown in the table.

Comparative Example 1-3

Using the aforementioned components, a solvent type curable organopolysiloxane composition was prepared similarly to the Examples by the compositions shown in Table 3, and then the aforementioned various measurements were performed.

Comparative Example 4

Other than component (F): polydimethylsiloxane blocked by dimethylvinylsiloxy groups on both terminals (siloxane degree of polymerization: 153), component (G): polymethyl hydrogensiloxane blocked with trimethylsilyl on both terminals (siloxane degree of polymerization: 10), and component (C1) were used at the added amount described in Table 3, a solvent-free type curable organopolysiloxane composition was prepared similarly to the Examples, and then the aforementioned various measurements were performed.

Note that for components (F) and (G), the silicon-bonded hydrogen atoms (Si—H) of component (G) were used at an amount of 0.41 mols per 1 mol of vinyl groups.

TABLE 1

| | Example No. | | | | | | | |
|---|---|---|---|---|---|---|---|---|
| | 1 | 2 | 3 | 4 | 5 | 6 | 7 | 8 |
| Component (a1) | 29.17 | 39.01 | 48.85 | 58.77 | 68.80 | 78.83 | 88.98 | — |
| Component (a2) | 67.75 | 58.22 | 48.71 | 39.12 | 29.42 | 19.71 | 9.89 | 95.96 |
| Component (B1) | 2.82 | 2.49 | 2.17 | 1.85 | 1.52 | 1.19 | 0.86 | 3.77 |
| Component (E1) | 0.12 | 0.14 | 0.13 | 0.12 | 0.11 | 0.12 | 0.12 | 0.12 |
| Component (C1) | 0.14 | 0.14 | 0.14 | 0.14 | 0.14 | 0.15 | 0.15 | 0.14 |
| Component (D) | 0 | 0 | 0 | 0 | 0 | 20 | 20 | 0 |
| SiH/Vi ratio | 0.48 | 0.47 | 0.47 | 0.47 | 0.46 | 0.44 | 0.42 | 0.49 |
| Component (A) average degree of polymerization | 44 | 50 | 57 | 67 | 82 | 104 | 143 | 33 |
| Transparency (Visual) | Transparent | Transparent | Transparent | Transparent | Transparent | Transparent | Transparent | Transparent |
| Specific Permittivity | 7 | 7 | 7 | 7 | 7 | 7 | 7 | 7 |
| Pressure-Sensitive Adhesive Force (N/m) | 2.3 | 3.5 | 4.9 | 5.7 | 9.2 | 23.0 | 21.1 | No pressure-sensitive adhesion |
| Compression ratio (%) | 19 | 23 | 23 | 22 | 27 | 32 | 34 | 19 |
| Compression residual strain (%) | 0 | 2 | 5 | 7 | 19 | 31 | 37 | 0 |

TABLE 2

| | Example No. | | | | | | | | |
|---|---|---|---|---|---|---|---|---|---|
| | 9 | 10 | 11 | 12 | 13 | 14 | 15 | 16 | 17 |
| Component (a1) | 29.04 | 38.84 | 48.71 | 58.64 | 68.63 | 78.69 | 88.82 | | |
| Component (a2) | 67.75 | 58.26 | 48.71 | 39.09 | 29.41 | 19.67 | 9.87 | | |
| Component (a3) | | | | | | | | 97.05 | |
| Component (a4) | | | | | | | | | 98.71 |
| Component (B1) | 2.95 | 2.63 | 2.32 | 2.00 | 1.69 | 1.37 | 1.04 | | 1.03 |
| Component (B2) | | | | | | | | 1.65 | |
| Component (B3) | | | | | | | | 1.15 | |
| Component (E1) | 0.12 | 0.12 | 0.12 | 0.12 | 0.12 | 0.12 | 0.12 | | 0.12 |
| Component (E2) | | | | | | | | 0.07 | |
| Component (C1) | | | | | | | | | |
| Component (C2) | 0.14 | 0.14 | 0.14 | 0.14 | 0.14 | 0.14 | 0.15 | 0.08 | 0.15 |
| Component (D) | | | | | | 20 | 20 | | |
| SiH/Vi ratio | 0.50 | 0.50 | 0.50 | 0.50 | 0.50 | 0.50 | 0.50 | 0.50 | 0.50 |
| Component (A) average degree of polymerization | 44 | 50 | 57 | 67 | 82 | 104 | 143 | 90 | 148 |
| Transparency (Visual) | Transparent | Transparent | Transparent | Transparent | Transparent | Transparent | Transparent | Transparent | Transparent |
| Specific Permittivity | 7 | 7 | 7 | 7 | 7 | 7 | 7 | 6 | 7 |
| Pressure-Sensitive Adhesive Force (N/m) | 2.7 | 3.5 | 4.6 | 8.1 | 13.3 | 14.5 | 16.2 | 5.7 | 4.5 |
| Compression ratio (%) | 19 | 20 | 21 | 21 | 23 | 22 | 22 | 30 | 21 |
| Compression residual strain (%) | 0 | 0 | 0 | 4 | 9 | 11 | 14 | 10 | 0 |

TABLE 3

| Comparative Example No. | 1 | 2 | 3 | 4 |
|---|---|---|---|---|
| Component (a1) | 99.17 | 99.06 | 98.94 | |
| Component (a2) | | | | |
| Component (F) | | | | 98.72 |
| Component (B1) | 0.54 | 0.65 | 0.78 | |
| Component (G) | | | | 0.99 |
| Component (E1) | 0.13 | 0.12 | 0.12 | |
| Component (C1) | 0.16 | 0.16 | 0.16 | 0.29 |
| Component (D) | 20 | 20 | 20 | |
| SiH/Vi ratio | 0.38 | 0.46 | 0.55 | 0.41 |
| Component (A) average degree of polymerization | 229 | 229 | 229 | — |
| Transparency (Visual) | Transparent | Transparent | Transparent | Transparent |
| Specific Permittivity | 7 | 7 | 7 | 3 |
| Pressure-Sensitive Adhesive Force (N/m) | 16.2 | 32.8 | 23.5 | No pressure-sensitive adhesion |
| Compression ratio (%) | 37 | 26 | 22 | 21 |
| Compression residual strain (%) | 37 | 26 | 14 | 0 |

Note that for Example 7 and Comparative Example 1, FIG. 1 and FIG. 2 show recording curves of the strain–compressive force according to the 8 measurements using the aforementioned method. In FIG. 1 (Example 7), even if a compressive force is applied 8 times, the recovery force was found to be excellent, and deviation in the recording curve was found to be small. On the other hand, in FIG. 2 (Comparative Example 1), if a compressive force was applied 8 times, the compression ratio gradually changed from the first measurement, and the recovery force was confirmed to be inferior.

The invention claimed is:

1. A touch panel comprising:
a substrate where a conductive layer is formed on one surface; and
a film-shaped or sheet-shaped cured layer formed by curing a curable organopolysiloxane composition containing a fluoroalkyl group, adhered to the conductive layer of the substrate or a surface on an opposite side thereof; wherein the curable organopolysiloxane composition containing a fluoroalkyl group comprises:
(A) 100 parts by mass of an organopolysiloxane containing a fluoroalkyl group, having at least two alkenyl groups with 2 to 12 carbon atoms in a molecule, where 10 mol % or more of all substitution groups on the silicon atoms is a fluoroalkyl group as expressed by $(C_pF_{2p+1})$—R— where R represents an alkylene group with 1 to 10 carbon atoms, and p represents an integer from 1 to 8, and the average degree of polymerization is less than 150;
(B) an organohydrogen polysiloxane having at least two silicon-bonded hydrogen atoms in a molecule at an amount where the silicon-bonded hydrogen atoms in the component is 0.1 to 1.0 mol with regard to a total of 1 mol of the alkenyl groups in component (A);
(C) an effective amount of a hydrosilylation reaction catalyst; and
(D) 0 to 2,000 parts by mass of a solvent, with regard to a total of 100 parts by mass of components (A) to (C).

2. The touch panel according to claim 1, wherein component (A) is an organopolysiloxane as expressed by the following average unit formula (I):

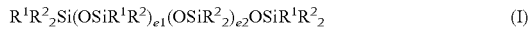

where $R^1$ represents the fluoroalkyl group as expressed by $(C_pF_{2p+1})$—R— or an alkenyl group with 2 to 12 carbon atoms, $R^2$ independently represents an alkyl group with 1 to 12 carbon atoms, an aryl group with 6 to 20 carbon atoms, an aralkyl group with 7 to 20 carbon atoms, a hydroxyl group, or an alkoxy group with 1 to 6 carbon atoms, where of all $R^1$s, at least two are alkenyl groups with 2 to 12 carbon atoms, and of all $R^1$s and $R^2$s, 10 mol % or more are the fluoroalkyl group; and e1 and e2 represent 0 or a positive number, and are numbers that satisfy 5<e1+e2<148.

3. The touch panel according to claim 1, wherein component (A) is an organopolysiloxane as expressed by the following average unit formula (II):

where $R^{vi}$ represents an alkenyl group with 2 to 12 carbon atoms, $R^2$ independently represents an alkyl group with 1 to 12 carbon atoms, an aryl group with 6 to 20 carbon atoms, an aralkyl group with 7 to 20 carbon atoms, a hydroxyl group, or an alkoxy group with 1 to 6 carbon atoms, $R^3$ represents the fluoroalkyl group as expressed by $(C_pF_{2p+1})$—R—, and e is a number that satisfies 5<e<148.

4. The touch panel according to claim 1, wherein the fluoroalkyl group as expressed by $(C_pF_{2p+1})$—R— in component (A) is a trifluoropropyl group.

5. The touch panel according to claim 1, wherein component (B) is an organohydrogen polysiloxane having a group containing fluorine.

6. The touch panel according to claim 1, wherein component (B) is an organohydrogen polysiloxane having a fluoroalkyl group as expressed by $(C_pF_{2p+1})$—R— where R represents an alkylene group with 1 to 10 carbon atoms, and p represents an integer from 1 to 8.

7. The touch panel according to claim 1, wherein component (B) is an organohydrogen polysiloxane having a trifluoroalkyl group in a molecule.

8. The touch panel according to claim 1, wherein component (B) is an organohydrogen polysiloxane as expressed by the following average unit formula (III) or (IV):

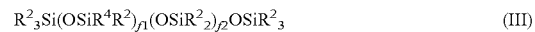

where $R^4$ represents a fluoroalkyl group as expressed by $(C_pF_{2p+1})$—R— where R represents an alkylene group with 1 to 10 carbon atoms, and p represents an integer from 1 to 8, or a silicon-bonded hydrogen atom, $R^2$ independently represents an alkyl group with 1 to 12 carbon atoms, an aryl group with 6 to 20 carbon atoms, an aralkyl group with 7 to 20 carbon atoms, a hydroxyl group, or an alkoxy group with 1 to 6 carbon atoms, where of all $R^4$s, at least two are silicon-bonded hydrogen atoms, and f1 and f2 represent 0 or a positive number, and are numbers that satisfy 5<f1+f2<150;

where $R^5$ represents a fluoroalkyl group as expressed by $(C_pF_{2p+1})$—R— where R represents the same group as above, and p represents the same number as above, $R^2$ represents the same group as above, f3 and f4 represent a positive number, and f3+f4 is a number where the weight average molecular weight of the organohydrogen polysiloxane as expressed by formula (IV) is within a range of 400 to 10,000.

9. The touch panel according to claim 1, wherein component (A) is the following component (A1) or component (A2):
(A1) an organopolysiloxane having at least two alkenyl groups with 2 to 12 carbon atoms in a molecule, where 10 mol % or more of all substitution groups on the silicon atoms is the fluoroalkyl group as expressed by $(C_pF_{2p+1})$—R—, the average degree of polymerization is less than 150, and the volume content rate of organopolysiloxane having a degree of polymerization of 250 or more is less than 10%; and
(A2) an organopolysiloxane containing a fluoroalkyl group, containing the following component (a1) and component (a2) with different molecular weight distribution, where the average degree of polymerization of the entire mixture is less than 150:
(a1) an organopolysiloxane having at least two alkenyl groups with 2 to 12 carbon atoms in a molecule, where 10 mol % or more of all substitution groups on the silicon atoms is the fluoroalkyl group as expressed by $(C_pF_{2p+1})$—R—, and the average degree of polymerization is 200 or more; and
(a2) an organopolysiloxane having at least two alkenyl groups with 2 to 12 carbon atoms in a molecule, where 10 mol % or more of all substitution groups on the silicon atoms is the fluoroalkyl group as expressed by $(C_pF_{2p+1})$—R—, and the average degree of polymerization is 50 or less.

10. The touch panel according to claim 1, wherein the substrate on which the conductive layer is formed is a resin film or glass plate on which an ITO layer is formed on one surface.

* * * * *